Sept. 4, 1928.  1,682,759

H. KOCOUREK

HAND GUARD FOR SHEEP SHEARS

Filed March 10, 1927

Inventor
Henry Kocourek
by Burton & Burton
his Attorneys

Patented Sept. 4, 1928.

1,682,759

UNITED STATES PATENT OFFICE.

HENRY KOCOUREK, OF CHICAGO, ILLINOIS, ASSIGNOR TO CHICAGO FLEXIBLE SHAFT COMPANY, OF CHICAGO, ILLINOIS, A CORPORATION OF ILLINOIS.

HAND GUARD FOR SHEEP SHEARS.

Application filed March 10, 1927. Serial No. 174,156.

The purpose of this invention is to provide an improved construction of a hand-grasped power-operated sheep shear and like tool for guarding the hand of the operator against the movements of the journal bearing for the power shaft which is customarily hinged to the hand-grasped casing. It consists in the elements and features of construction shown and described as indicated in the claims.

In the drawings:—

Figure 1:
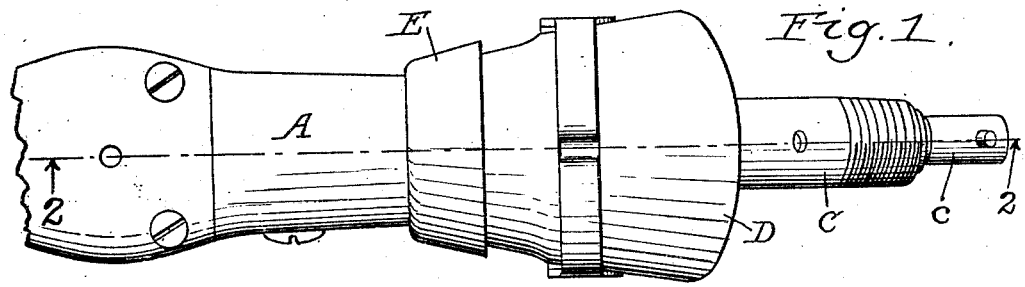
Figure 1 is a plan view of a sheep shear embodying this invention, the forward and rear parts being broken away to reduce the figure.

Referring to the drawings:—The casing which constitutes the hand-grasped portion of the tool is indicated at A. B is the customary journal bearing for the inleading cutter-actuating shaft, $a$, said journal bearing being swiveled in the casing as in the customary construction. C is the journal bearing for the antecedent power shaft, $c$, said journal bearing, C, being hinged to the swiveled journal bearing, B, according to the customary construction. 20—20 are the intermeshing bevel gears on the shafts, $a$ and $c$, respectively, at whose pitch line the axis of the hinged connection between the journal bearing members, B and C, is located in accordance with the familiar construction. D is a flexible sheath which is secured at its forward end to the swiveled journal bearing member, B, and extends rearwardly for partly enclosing and guarding the hinge joint and the shaft connections thereat for securing the sheath to the swiveled journal bearing member, B. It is dimensioned at its forward end for wrapping about and substantially encompassing said swiveled journal bearing member a short distance rearward from the rear end of the casing from which said swiveled member protrudes. This swiveled member is necessarily enlarged toward its rear end sufficiently to locate the hinge between the two journal bearing members with its axis, as mentioned, above at the pitch line of the intermeshing gears on the two shafts, $a$ and $c$, and this enlargement is begun by tapering the journal bearing member from a point a short distance in the rear of the rear end of the casing as seen at 21; and advantage is taken of this enlargement for securing the forward end of the sheath to said swiveled journal bearing member. For this purpose there is provided a sheet metal ring, 25, dimensioned for encompassing the end portion of the sheath when the latter is wrapped about the swiveled journal bearing member at the tapered portion, 21, said ring being correspondingly tapered and slightly flanged inwardly at its smaller end for guarding the forward end of the sheath and having at its opposite end tangs 27, 27, and 28, which are engaged with the sheath, the tang, 28, being clinched down on the inner side thereof as seen at 28ª. This construction, it will be seen, renders the smaller end of the sheath substantially rigidly dimensioned for fitting the tapered enlargement 21. For holding the sheath securely on the swiveled journal bearing member at said enlargement, said swiveled member is threaded as seen at 29 for a short distance immediately forward of the tapered portion, 21, and there is provided a nut, 29ª, screwed onto the swiveled journal member at said threaded part which may be set up tightly against the forward end of the ring, 25, thereby crowding the sheath at its forward end tapered part onto the tapered shoulder of the casing.

Figure 2:
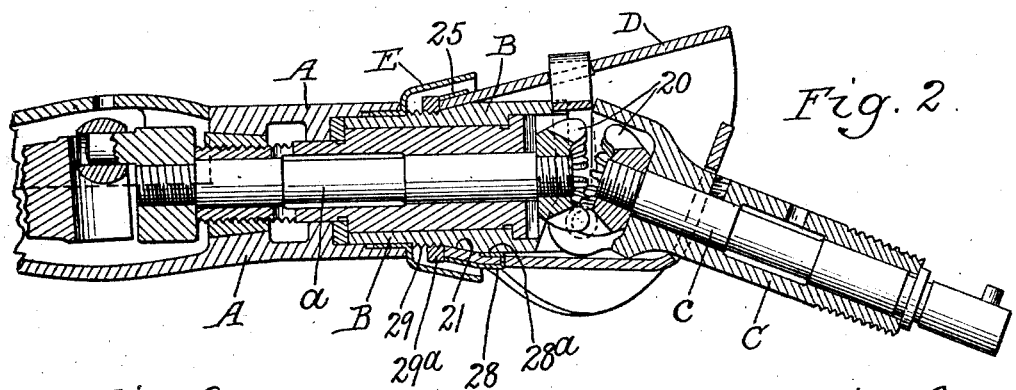
Figure 2 is a section at the line 2—2 on Figure 1.
Figure 3:
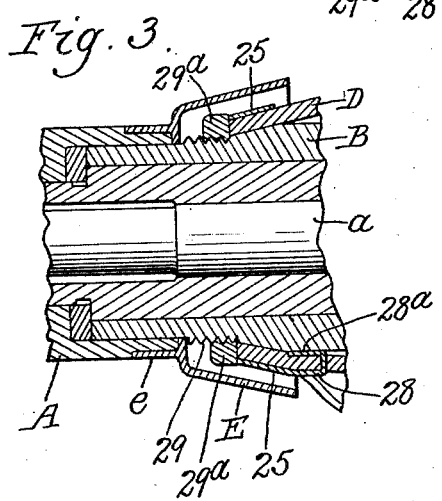
Figure 3 is a detail section corresponding to a portion of Figure 2 showing a slight modification.
Figures 5, 6:
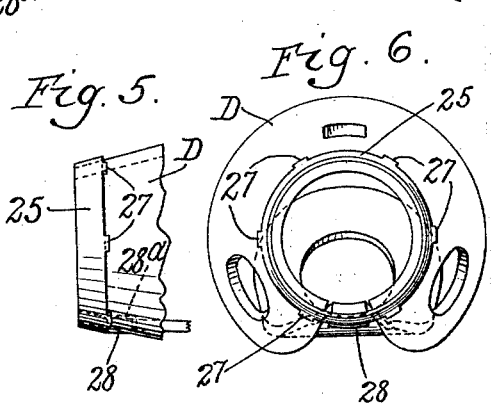
Figure 5 is a detail side elevation of the forward end portion of the sheath with said metallic terminal in space thereon.
Figure 6 is a forward end elevation of the sheath with said terminal applied, the parts enclosed by the sheath being omitted from the view.
Figure 4:
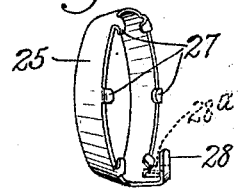
Figure 4 is a perspective view of a metallic terminal for securing the sheath which guards the hinge joint and gears thereat.

It will be recognized that the hand of the operator grasping the casing is exposed to the back-and-forth oscillatory movement of the enlarged rear portion of the swiveled journal bearing member and of the sheath or whatever means may be provided thereon for guarding the hinge joint and gear connections thereat, and that the constant rubbing upon the operator's hand or wrist to be very annoying and sometimes injurious and causing soreness of the hand, and at all times liable to interfere with his accurate handling of the tool in the shearing operations; and some means of shielding the hand from contact with these moving parts is desirable. Heretofore, the only means which has been employed for relieving against this inconvenience and annoyance, has consisted of a collar or ferrule mounted on the swiveled member and extended over the forward secured end of the sheath so as to substitute a smooth surface for the irregular surface of the sheath and its fastenings. But this construction does not obviate the defect of having the hand of the operator opposed to moving parts. In the present construction a ferrule, E, is provided secured rigidly to the casing, A, at the rear end thereof and extended flaringly rearward to overhang the tapered enlargement of the casing and enclose the forward end of the sheath and its securements on said enlarged portion of the swiveled journal bearing member, B. In the form shown in Figure 3, this ferrule has its forward cylindrical portion, e, dimensioned for fitting outside the rear end of the casing which is exteriorly rabbeted to form a seat for the cylindrical forward terminal of the ferrule which is permanently secured by bracing or being drive-fitted on said reduced portion of the casing. In the form shown in Figure 2 the rear end of the casing is interiorly rabbeted at a position corresponding to the interior rabbet, and the cylindrical forward end portion of the ferrule is correspondingly dimensioned to fit in said rabbet where it is permanently secured by bracing or being drive-fitted into its seat.

By this construction the hand of the operator is entirely guarded from contact with the oscillating parts which are carried by the rear hinged journal bearing member, C. The construction yields the very substantial advantage of shortening the casing to the extent of from one-half inch to three-quarters of an inch, because in the absence of protection against contact with the rear moving parts it has heretofore been necessary to make the hand piece long enough to accommodate the hand of the operator having a hand of the largest size without dangerously overhanging the moving parts. When the casing is provided with a fixed ferrule flaring as shown to encompass the rear parts, this ferrule may be extended to a distance adequate to accommodate and guard the largest hand against the said moving parts, and such extension involving merely overlap upon the parts against which it guards, does not involve any extension in the casing itself or any elongation of the tool as a whole.

I claim:—

1. In a power-driven sheep shear and the like tool having a hand-grasped casing for the cutter-actuating means, a journal bearing member for the inleading shaft of said means swiveled to said hand-grasped casing, a journal bearing member for an antecedent shaft member hingedly joined to said swiveled journal bearing member; a sheath for the hinge joint and power-communicating means thereat between said antecedent shaft and cutter-actuating shaft, said sheath being carried by said swiveled journal bearing member in the swiveling movement of the latter, and a ferrule for covering the forward end of said sheath, mounted rigidly with respect to the hand-grasped casing.

2. In the construction defined in claim 1, the sheath being of flexible material rabbeted at the forward end about the swiveled journal bearing member rearward of its swivel engagement with the casing, and a metal ring within which the forward rabbet end of the sheath extends, having tangs clinched into the margin of the sheath at said journal-bearing-enwrapping end, and means securing said ring to said journal bearing member for holding the sheath also thereto, the ferrule being dimensioned and positioned on the casing for encompassing said sheath-holding ring.

3. In a power-driven sheep shear and like tool having a hand-grasped casing for the main actuating means, a journal bearing member for the inleading shaft of said means swiveled to the casing, and a journal bearing for an antecedent power shaft hinged to said swiveled journal bearing, the swivel member having an enlargement at the end affording means for positioning the hinge laterally with respect to the axis far enough to accommodate driving connections between the cutter-actuating shaft and an antecedent shaft, and a ferrule fast on the casing dimensioned for guarding the hand of the operator from the enlargement of the swiveled member.

4. In a power-driven sheep shear and the like tool comprising a hand-grasped casing for the cutter-actuating means, a journal bearing for the shaft of said means swiveled to said casing, and a journaled bearing member for the antecedent power shaft hinged to said swiveled journal bearing member, a flexible sheath for guarding the hinge, and the shaft connections thereat, said sheath being rabbeted at its forward end about the swiveled member forward of the hinge and rearward of the swivel joint; a metal ring encompassing the rabbeted end of the sheath having tangs by which it is clinched to the forward-end margin of the sheath, and a collar having threaded engagement with the swiveled journal member dimensioned and positioned on the latter for being screwed up against the clinched ring for holding the latter to the sheath.

5. In a power-driven sheep shear and the like tool comprising a hand-grasped casing for the cutter-actuating means, a journal bearing for the shaft of said means swiveled to said casing, and a journaled bearing member for the antecedent power shaft hinged to said swiveled journal bearing member, said member being enlarged in diameter toward the hinge, a flexible sheath for guarding the hinge, and the shaft connections thereat having its forward end rabbeted on the swiveled member forward of and about the enlargement, a ring of greater and lesser diameters at the rear and forward ends respectively, diametered at the rear for encompassing the sheath rabbeted on the enlargement, and at the forward end for substantially fitting the swiveled member forward of the enlargement; means at the end of greater diameter for engaging the sheath for holding the same rabbeted on the enlargement, said swiveled member being threaded forward of the enlargement, and a nut screwed onto it adapted to be set up against the smaller end of the sheath-encompassing ring.

6. In combination with the structure defined in claim 5, a ferrule fast on the rear end of the casing standing in advance of the nut, sheath-clinching ring and sheath, diametered in excess of the nut, and ring for guarding the hand of the operator from contact with said sheath or sheath-holding means.

7. In the construction defined in claim 5, a ferrule rigidly secured to the rear end of the casing and extending flaringly rearward to overhang and encase in spaced relation the forward end of said sheath, ring and nut; the rear end of said ferrule terminating beyond the rear edge of the ring.

In testimony whereof, I have hereunto set my hand at Chicago, Illinois, this 8th day of March, 1927.

HENRY KOCOUREK.